(12) United States Patent
Ewald et al.

(10) Patent No.: US 11,554,682 B2
(45) Date of Patent: Jan. 17, 2023

(54) CHARGING DEVICE FOR CHARGING A BATTERY OF AN ELECTRICALLY OPERATED MOTOR VEHICLE

(71) Applicant: Bayerische Motoren Werke Aktiengesellschaft, Munich (DE)

(72) Inventors: Alexander Ewald, Garching (DE); Bernhard Hoess, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/258,792

(22) PCT Filed: Jun. 12, 2019

(86) PCT No.: PCT/EP2019/065267
§ 371 (c)(1),
(2) Date: Jan. 8, 2021

(87) PCT Pub. No.: WO2020/011469
PCT Pub. Date: Jan. 16, 2020

(65) Prior Publication Data
US 2021/0276440 A1    Sep. 9, 2021

(30) Foreign Application Priority Data
Jul. 11, 2018   (DE) .................... 10 2018 211 507.9

(51) Int. Cl.
*B60L 53/35* (2019.01)
*B60L 53/16* (2019.01)
(Continued)

(52) U.S. Cl.
CPC ............ *B60L 53/35* (2019.02); *B25J 19/065* (2013.01); *B60L 53/16* (2019.02); *B60L 53/18* (2019.02);
(Continued)

(58) Field of Classification Search
CPC   B60L 53/35; B60L 53/16; B60L 53/18; H02J 7/00304; H02J 7/0045; B25J 19/065
(Continued)

(56) References Cited

U.S. PATENT DOCUMENTS 5,306,999 A * 4/1994 Hoffman ................. B60L 53/16
320/109
5,344,331 A * 9/1994 Hoffman ............... H01R 13/641
439/138
(Continued)

FOREIGN PATENT DOCUMENTS

AT          516728 B1     8/2016
CN     102598428 A  *  7/2012   ......... H01R 13/5808
(Continued)

OTHER PUBLICATIONS

International Search Report (PCT/ISA/210) issued in PCT Application No. PCT/EP2019/065267 dated Jul. 16, 2019 with English translation (five (5) pages).
(Continued)

*Primary Examiner* — Suresh Memula
(74) *Attorney, Agent, or Firm* — Crowell & Moring LLP

(57) ABSTRACT

A charging apparatus for charging a battery of an electrically operable vehicle includes a plug element, a base element, and adjusting facility. The plug element is connectable to a corresponding, vehicle-side plug element of the motor vehicle and via which electrical energy is transferrable to the motor vehicle so as to charge the battery. The base element is connected to a current source and provides electrical energy from the current source for the plug element. Via the adjusting facility the plug element is movable relative to the base element in order to connect the plug element to the vehicle-side plug element, and via which an electrical connection is provided between the base element and the plug element. The adjusting facility has an overload protection
(Continued)

via which the base element is electrically separated from the plug element in the event of a predetermined mechanical maximal load being exceeded.

6 Claims, 1 Drawing Sheet

(51) Int. Cl.
  *B60L 53/18* (2019.01)
  *H02J 7/00* (2006.01)
  *B25J 19/06* (2006.01)
(52) U.S. Cl.
  CPC ........ *H02J 7/0045* (2013.01); *H02J 7/00304* (2020.01)
(58) Field of Classification Search
  USPC .......................................................... 320/109
  See application file for complete search history.

(56) References Cited

U.S. PATENT DOCUMENTS

| | | | | |
|---|---|---|---|---|
| 5,385,480 | A * | 1/1995 | Hoffman | B60R 16/02 439/138 |
| 5,427,542 | A * | 6/1995 | Gerow | H01R 13/633 439/314 |
| 6,910,911 | B2 * | 6/2005 | Mellott | H01R 13/2421 439/341 |
| 7,878,866 | B1 * | 2/2011 | Kwasny | H01R 13/633 439/923 |
| 8,410,369 | B2 * | 4/2013 | Kim | H01R 13/5841 439/923 |
| 8,591,249 | B2 * | 11/2013 | Harnish | H01R 13/562 439/447 |
| 9,093,788 | B2 * | 7/2015 | Lamb | B60D 1/64 |
| 10,044,137 | B2 * | 8/2018 | Petrie | B60L 53/16 |
| 10,084,266 | B1 * | 9/2018 | Tsao | B60L 53/18 |
| 10,622,762 | B1 * | 4/2020 | McKee | H01R 13/506 |
| 11,017,969 | B1 * | 5/2021 | Hellmers | H01H 3/16 |
| 2006/0068636 | A1 * | 3/2006 | Meleck | H01R 13/6271 439/606 |
| 2006/0068637 | A1 * | 3/2006 | Meleck | H01R 13/6271 439/606 |
| 2011/0059642 | A1 * | 3/2011 | Slippy | H01R 13/5808 439/449 |
| 2011/0065305 | A1 * | 3/2011 | Amit | H01R 31/06 439/368 |
| 2011/0140658 | A1 * | 6/2011 | Outwater | B60L 53/35 320/109 |
| 2011/0269332 | A1 | 11/2011 | Kim et al. | |
| 2011/0300733 | A1 * | 12/2011 | Janarthanam | H01R 13/6392 439/304 |
| 2012/0003861 | A1 * | 1/2012 | Kwasny | B60L 53/18 439/474 |
| 2012/0129369 | A1 * | 5/2012 | Bogart | B60L 58/10 439/153 |
| 2012/0306444 | A1 * | 12/2012 | Pham | B60L 3/00 320/109 |
| 2013/0134933 | A1 * | 5/2013 | Drew | B60L 53/31 361/103 |
| 2013/0187601 | A1 | 7/2013 | Petrie et al. | |
| 2013/0257373 | A1 * | 10/2013 | Mallon, IV | F16L 3/16 248/65 |
| 2014/0094046 | A1 * | 4/2014 | Lamb | H01R 13/633 439/152 |
| 2015/0263549 | A1 | 9/2015 | Lee et al. | |
| 2016/0332525 | A1 | 11/2016 | Kufner et al. | |
| 2017/0217324 | A1 * | 8/2017 | Buehs | B60L 53/16 |
| 2018/0342844 | A1 * | 11/2018 | Broere | B60L 53/16 |
| 2019/0386433 | A1 * | 12/2019 | Masaki | H02J 7/0045 |

FOREIGN PATENT DOCUMENTS

| | | | | |
|---|---|---|---|---|
| CN | 106061790 | A | | 10/2016 |
| CN | 206322938 | U | | 7/2017 |
| CN | 111064046 | A * | 4/2020 | ............. B60L 53/16 |
| CN | 111740279 | A * | 10/2020 | ............. B60L 53/16 |
| CN | 112009280 | A * | 12/2020 | |
| DE | 102011078348 | A1 * | 1/2012 | ......... B60L 11/1818 |
| EP | 0629024 | A1 * | 12/1994 | |
| JP | 2012128972 | A * | 7/2012 | ......... B60L 11/1818 |
| JP | 2014-72061 | A | | 4/2014 |
| KR | 10-2015-0127571 | A | | 11/2015 |
| WO | WO-9416475 | A1 * | 7/1994 | ......... B60L 11/1818 |
| WO | WO-9418723 | A1 * | 8/1994 | ......... B60L 11/1818 |
| WO | WO-2011112247 | A1 * | 9/2011 | ......... B60L 11/1816 |
| WO | WO-2012078921 | A2 * | 6/2012 | ......... B60L 11/1818 |
| WO | WO-2019002868 | A1 * | 1/2019 | ............. B60L 50/60 |

OTHER PUBLICATIONS

German-language Written Opinion (PCT/ISA/237) issued in PCT Application No. PCT/EP2019/065267 dated Jul. 16, 2019 (six (6) pages).

English translation of Chinese-language Office Action issued in Chinese Application No. 201980045185.9 dated Sep. 1, 2022 (six (6) pages).

* cited by examiner

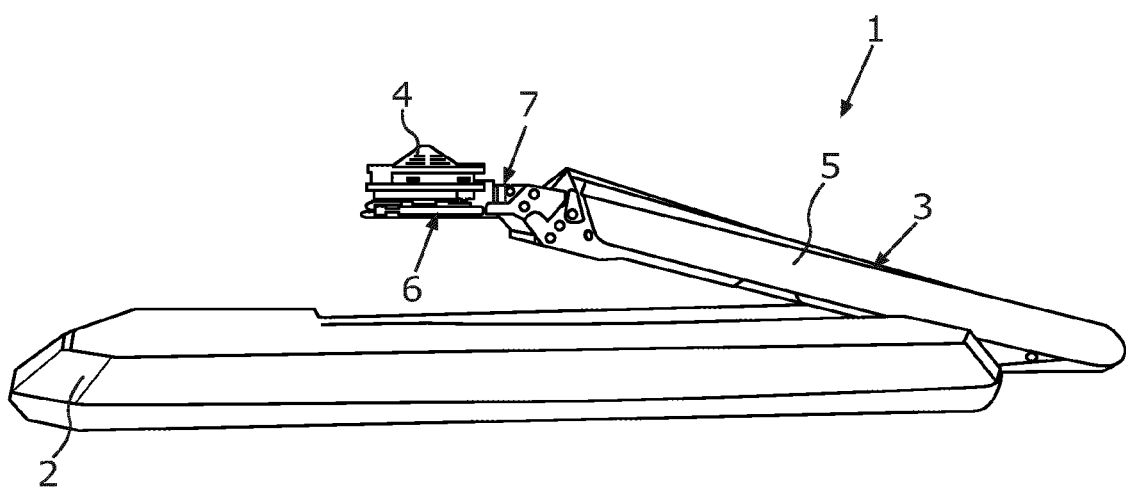

CHARGING DEVICE FOR CHARGING A BATTERY OF AN ELECTRICALLY OPERATED MOTOR VEHICLE

BACKGROUND AND SUMMARY OF THE INVENTION

This disclosure relates to a charging apparatus for charging a battery of an electrically operable motor vehicle in accordance with the preamble of the independent claim.

There is a charging apparatus for a vehicle, wherein a contacting plate that can be attached to a vehicle is configured with a multiplicity of positioning elements and at least one connecting element is provided for transferring current. During the procedure of bringing together the connecting element and the contacting plate, the connecting element latches in one of the positioning elements irrespective of the position and in a flexible manner. The connecting element can be part of a lifting device that can be arranged on a ground surface of a private parking place or on the ground of a public area so as to charge vehicles. In particular, the lifting device is configured as a robotic arm. By virtue of such an arrangement of the contacting plate on the vehicle on the one hand and the arrangement of the connecting element or the lifting device on the other hand, it is possible in a simple and automated manner to connect the connecting element to the contacting plate or to a positioning element that is arranged on the contacting plate.

One of the objects of the present disclosure is to provide a charging apparatus for charging a battery of an electrically operable motor vehicle and the charging apparatus is to be particularly well protected against being damaged.

This and other objects are achieved in accordance with this disclosure by means of a charging apparatus for charging a battery of an electrically operable motor vehicle.

This disclosure relates to a charging apparatus for charging a battery of an electrically operable motor vehicle and the charging apparatus has a plug element that can be connected to a corresponding, vehicle-side plug element of the motor vehicle and by means of which electrical energy can be transferred to the motor vehicle so as to charge the battery. For this purpose, the plug element can have for example a plug-in connector that can be brought into engagement with a socket of the corresponding, vehicle-side plug element in order to transfer electrical energy from the plug-in connector to the socket. Furthermore, the charging apparatus comprises a base element that is connected to a current source and provides electrical energy from the current source for the plug element. The current source can be for example a power supply that supplies the base element with electrical energy. In addition, the charging apparatus comprises an adjusting facility by means of which the plug element can be moved relative to the base element in order to connect the plug element to the vehicle-side plug element. Furthermore, the adjusting facility represents an electrical connection between the base element and the plug element. This means that it is possible by means of the adjusting facility to move the plug element relative to the base element in a three dimensional manner in order to move the plug element toward the vehicle-side plug element and to connect it thereto. In particular, the adjusting facility is a robotic facility that is attached at one end to the base element and at the other end is attached to the plug element. Furthermore, the adjusting facility provides the electrical connection between the base element and the plug element, wherein electrical energy is transferred from the base element to the plug element by way of the electrical connection.

In order to realize a particularly good protection against being damaged, it is provided in accordance with this disclosure that the adjusting facility has an overload protection by means of which the base element is to be electrically separated from the plug element if a predetermined mechanical maximal load of the adjusting facility is exceeded. The overloading of the adjusting facility can occur for example in the form of mechanical stresses, in particular if the motor vehicle is moved relative to the base element. In this case, it is possible for example for the plug element of the charging apparatus that is connected to the vehicle-side plug element to be moved simultaneously with the motor vehicle, wherein the base element is rigidly connected to the underbody of the vehicle. As a consequence, mechanical loads can occur in the adjusting facility which can lead to the adjusting facility becoming damaged. In order to avoid that as a result of such damage the electrical connection becomes damaged with the result that voltage-carrying elements of the adjusting facility are exposed, the plug element is electrically separated from the base element as soon as the predetermined mechanical maximal load is exceeded. Where appropriate, it is also possible in the form of an overload protection to mechanically separate the base element from the plug element in order to avoid an uncontrolled breakaway of the adjusting facility. The controlled electrical separation of the plug element from the base element in the event of the adjusting facility being mechanically overloaded renders it possible that exposed current-carrying elements as a result of damage have been avoided.

In this context, it has proven to be particularly advantageous if the adjusting facility has a lifting arm for moving the plug element relative to the base element, wherein at least one desired separation site is provided as the overload protection on the lifting arm. The lifting arm can be mechanically separated at the desired separation site in order to separate the plug element from the base element in the event of the predetermined mechanical maximal load being exceeded. The lifting arm can be a robotic arm by means of which the plug element can be moved in a three dimensional manner relative to the base element. This lifting arm has at least one desired separation site at which the lever arm is separated in a controlled manner in the case of a mechanical overload in order to mechanically separate the plug element from the base element. The at least one desired separation site can be for example a desired breakaway site at which the lever arm breaks away in the case of the mechanical overload and consequently in the event of the mechanical maximal load being exceeded. By virtue of breaking away, the lifting arm can be divided into at least two parts, wherein one of the parts is connected to the plug element and the other part is connected to the base element. Alternatively, the lifting arm can have the at least one desired separation site where it is connected to the plug element and/or where it is connected to the base element, as a result of which the lifting arm is separated from the plug element and/or from the base element by means of breaking away in the case of a mechanical overload. The at least one desired separation site can have alternatively or in addition a magnetic facility, the magnetic force of which corresponds to the predetermined mechanical maximal load. If a mechanical load of the lifting arm exceeds the predetermined mechanical maximal load, then the magnetic force of the magnetic facility is overcome and the lifting arm divided into parts and/or separated from the plug element and/or from the base element. The procedure of separating the adjusting facility by means of the magnetic facility has in particular the advantage that the adjusting facility is mechanically separated without incurring any damage and can be subsequently mechanically reconnected without the adjusting facility being damaged. The connection between the plug element and the base element can consequently be reversibly separated, with the result that the adjusting facility can be advantageously reused on numerous occasions even after being mechanically overloaded.

It has shown to be further advantageous if the adjusting facility has a charging cable for transferring electrical energy from the base element to the plug element, wherein the charging cable comprises as the overload protection a plug-in connection that in the event of the predetermined mechanical maximal load being exceeded divides the charging cable into parts and/or separates the charging cable from the plug element and/or from the base element. This means that the charging cable has the plug-in connection which in the event of the predetermined mechanical maximal load being exceeded is separated in order to electrically separate the plug element from the base element. In this case, the plug element ensures that, in the case of a mechanical separation of the base element from the plug element, current-carrying elements of the charging cable are not exposed, in that in the separated state the plug-in connection prevents the charging cable from carrying current. As a consequence, the charging cable can be particularly reliably and safely electrically divided into parts in the case of a mechanical overload. In particular, the plug-in connection is configured in such a manner that the charging cable only then carries electrical energy if the plug-in connection is closed. In particular, the plug-in connection can comprise at least one mechanical safety facility that in the unplugged state of the plug-in connection prevents a current-carrying element of the charging cable becoming exposed, in that in the case of an unplugged plug-in connection the safety element for example electrically shields the respective current-carrying element of the charging cable in the region of the plug-in connection.

In this context, it has proven to be advantageous if the plug-in connection comprises a first connecting face of the plug element and a second connecting face of the adjusting facility, which in order to attach the plug element to the adjusting facility can be connected to one another at their respective faces and are held against one another by way of a magnetic force. This means that in the form of a plug-in connection the adjusting facility and the plug element are held against one another by way of their respective connecting faces by means of magnetic force. The connecting faces render it possible to transfer current or voltage between the adjusting facility and the plug element. For example, at least one of the connecting faces can be magnetic. It is hereby possible to provide a non-positive connection between the plug element and the adjusting facility. If as a result of the mechanical overload of the adjusting facility, the magnetic force is overcome, then the plug element is separated from the adjusting facility. The surface contact between the plug element and the adjusting facility prevents directional sensitivity of the plug-in connection with respect to a directional effect of the mechanical load.

In a further advantageous embodiment of the disclosure, it is provided that the plug element is attached to the adjusting facility by means of a magnetic attachment, wherein the magnetic attachment separates the plug element from the adjusting facility in the event of the predetermined mechanical maximal load being exceeded. In this case, the plug element is mechanically and/or electrically separated from the adjusting facility by means of the magnetic attachment in the event of the predetermined mechanical maximal load being exceeded. In this case, the mechanical attachment can be integrated in a holding facility by means of which the plug element is attached to the adjusting facility and in particular to the lifting arm. As a consequence, it is rendered possible that in the event of a mechanical overload the plug element can be separated from the adjusting facility in a particularly simple and particularly rapid manner.

In a further embodiment of the disclosure, it has proven to be advantageous if the predetermined mechanical maximal load is below a breakaway load of the adjusting facility that leads to the breakaway. This means that the plug element is separated from the base element before the breakaway load of the adjusting facility is achieved with the result that it is possible to avoid at least essentially an uncontrolled breakaway of the adjusting facility. As a consequence, it can be ensured that the plug element is mechanically and/or electrically separated in a controlled manner from the base element in the event of a mechanical overload. An uncontrolled breakaway of the adjusting facility could for example lead to the vehicle that is to be charged by means of the charging apparatus becoming damaged, which can be avoided by virtue of the fact that the adjusting facility separates the plug element from the base element prior to the breakaway load being achieved, in particular in the case of the predetermined mechanical maximal load being achieved. The charging apparatus in accordance with this disclosure consequently renders it possible to charge the vehicle in a particularly safe and reliable manner, whereby it is possible by means of the overload protection in accordance with this disclosure to prevent uncontrolled damage to the adjusting facility.

Further features of the disclosure are disclosed in the claims, the figures and the description of the FIGURES. The feature combinations and features that are mentioned above in the description and also the feature combinations and features that are mentioned below in the description of the figures and/or are illustrated alone in the single FIGURE cannot only be used in the respective disclosed combination but can also be used in other combinations or stand-alone.

The embodiments of the invention are now further explained the aid of a preferred exemplary embodiment and with reference to the drawing, in which:

BRIEF DESCRIPTION OF THE DRAWING

FIG. 1 illustrates a schematic lateral view of a charging apparatus for charging a battery of an electrically operable motor vehicle.

DETAILED DESCRIPTION OF THE DRAWING

FIG. 1 illustrates a charging apparatus 1 having a base element on which it is possible by way of a robotic arm to arrange a plug element that can be connected to a corresponding vehicle-side plug element of the motor vehicle in order to charge the battery of the motor vehicle. It is possible by means of the charging apparatus 1 to transfer electrical energy from a current source, preferably a power supply, to a motor vehicle in order to charge a battery of the in particular electrically operable motor vehicle, in particular passenger car. The charging apparatus 1 comprises a base element 2, an adjusting facility 3 that can be connected to the base element 2, and also a plug element 4 that is connected to the base element 2 by way of the adjusting facility 3. The base element 2 is connected to the current source and is configured so as to receive electrical energy from the current source. By way of the adjusting facility 3, in particular a charging cable of the adjusting facility 3, it is possible to transfer the electrical energy from the base element 2 to the plug element 4. In addition to the charging cable, the adjusting facility 3 comprises a lifting arm 5 that is configured as a robotic arm and by means of which the plug element 4 can be moved relative to the base element 2. It is possible by means of the lifting arm 5 to adjust the plug element 4 into at least one non-use position and into at least one position of use that is different to the non-use position. In the non-use position, electrical energy is not transferred from the plug element 4 to the motor vehicle, whereas in the at least one position of use it is possible to transfer the energy already provided by the base element 2 to the motor vehicle by means of the plug element 4. For this purpose, when the plug element 4 is in its position of use it can be connected to a corresponding vehicle-side plug element of the motor vehicle in order to transfer the electrical energy to the motor vehicle so as to charge the battery.

The adjusting facility 3 is configured so as to orient a respective relative position of the motor vehicle that is to be charged by means of the charging apparatus 1 relative to the base element 2 in such a manner that the motor vehicle can be charged with electrical energy from the base element 2 by way of the plug element 4. In order to ensure that there is a particularly safe and reliable charging connection between the charging apparatus 1 and the electrically operable motor vehicle that is to be charged, the adjusting facility 3 has an overload protection by means of which, in the event of a predetermined mechanical maximal load of the adjusting facility 3 being exceeded, the base element 2 is electrically and mechanically separated from the plug element 4. The predetermined mechanical maximal load, above which the plug element 4 is mechanically and electrically separated from the base element 2, is in the current case below a breakaway load of the adjusting facility 3 that would lead to the uncontrolled breakaway with the result that it is possible to ensure that even in the case of a mechanical overload and consequently in the event of the predetermined mechanical maximal load being exceeded the adjusting facility 3 is protected against being damaged as a result of the uncontrolled breakaway.

The overload protection comprises in the current case a magnetic attachment 6 of the plug element 4 to the adjusting facility 3. In the event of a magnetic force of the magnetic attachment 6 being exceeded, the plug element 4 is separated mechanically from the adjusting facility 3 and consequently from the base element 2. In particular, the magnetic force corresponds to the predetermined mechanical maximal load of the adjusting facility 3.

Furthermore, the overload protection comprises a plug-in connection 7 between the plug element 4 and the adjusting facility 3. In particular, the plug element 4 can be connected to the charging cable of the adjusting facility 3 by means of the plug-in connection 7. If the charging cable is connected to the plug element 4 by way of the plug-in connection 7, then electrical energy is transferred from the base element 2 to the plug element 4 and from the plug element 4 to the motor vehicle. If as a result of the predetermined mechanical maximal load being exceeded, the plug-in connection 7 is separated with the result that the plug element 4 is electrically separated from the charging cable of the adjusting facility 3, then the plug-in connection 7 isolates the current-carrying or voltage-carrying elements of the plug element 4 and of the charging cable or of the adjusting facility 3 in order to prevent the current-carrying or voltage-carrying elements being exposed. The overload protection consequently renders it possible that, in the case of the controlled electrical separation of the plug element 4 from the adjusting facility 3, current-carrying or voltage-carrying elements are electrically isolated with the result that the charging apparatus 1 is also particularly safely and reliably in its separated state. As an alternative to the magnetic attachment 6 of the plug element 4 to the adjusting facility 3, the lifting arm 5 can have at least one magnetic facility which provides a mechanical desired separation site for the lifting arm 5.

The plug-in connection 7 can be configured according to a mechanical plug-in principle. Alternatively, the plug-in connection 7 can be configured in a magnetic manner. The magnetic design has the advantage that the current-carrying or voltage-carrying connection between the plug element 4 and the charging cable of the adjusting facility 3 can be provided by way of the respective planar, end-face connecting faces of the plug element 4 and the adjusting facility 3, in particular of the charging cable. The connection between the plug element 4 and the adjusting facility is consequently not realised in the case of the magnetic design of the plug-in connection 7 in a positive locking manner but rather in a non-positive locking manner with the result that it is possible to avoid directional sensitivity of the plug-in connection 7 with respect to the directional force of the mechanical overload.

The described charging apparatus 1 is based on the knowledge that in the case of electrical vehicles it has been hitherto necessary for a charging procedure to plug into the vehicle manually. This procedure is however time-consuming and less comfortable for a user. The charging apparatus 1 offers a possibility of charging the motor vehicle with the aid of a completely automated system, in particular with the aid of the adjusting facility 3 comprising the robotic arm, by way of the vehicle-side plug element that can be a charging socket on the underbody of the motor vehicle. The charging apparatus 1 that stands on a ground surface below the motor vehicle can for this purpose detect a position of the charging socket on the underbody of the motor vehicle and can connect the plug element 4 to the charging socket with the aid of the robotic arm.

The charging apparatus 1 renders it possible to connect the motor vehicle completely automatically to the plug element 4 and thereby charge the motor vehicle. During the charging procedure, the motor vehicle should not be moved. If the motor vehicle should move during the charging procedure, possibly as a result of the effect of an external force, then the motor vehicle and/or the charging apparatus 1 could become damaged. In particular, damage can occur to the charging apparatus 1 and/or high voltage lines in particular the charging cable can become exposed or fractured, and other voltage-carrying components of the charging apparatus 1 can become damaged in the event that the motor vehicle that is connected to the charging apparatus 1 sets itself in motion. In order to prevent damage to the high-voltage line or to the charging cable and other voltage-carrying components of the charging apparatus 1, the lifting arm 5 of the charging apparatus 1 can be supplemented by separation sites, in particular by desired separation sites. These desired separation sites render it possible to separate the plug element 4 from the lifting arm 5 in a defined manner. The respective desired separation site can be configured in such a manner that it separates under a specific load. Alternatively or in addition, the high-voltage cable can be divided into parts at least at one site by means of the plug-in connection 7 that releases under load. The plug connector 7 can be located both in the charging cable and also between the charging cable and the plug element 4, as illustrated in the single FIGURE. A load that is necessary for the plug-in connection 7 to separate can in this case be considerably below a load that would lead to the charging cable being damaged. In order to support the defined separation of the electrical connection between the plug element 4 and the charging cable, the magnetic attachment 6 of the plug element 4 can be provided on the lifting arm 5 in order to separate the plug element 4 from the adjusting element 3 in a controlled mechanical manner. Alternatively or in addition, a classic desired breakaway site or desired separation site can be provided for a mechanical separation of the plug element 4 from the lifting arm 5. The magnetic attachment 6 used in this case is configured in such a manner that the plug element 4 is separated from the lifting arm 5 in the case of a load which is below a breakaway load which would lead to the lifting arm 5 breaking away.

If the plug-in connection 7 is subjected to a load as a result of the vehicle that is connected to the plug element 4 setting itself in motion, the plug element 4 of the charging apparatus 1 releases itself in a controlled manner from the adjusting facility 3, in that the charging cable is separated at the plug-in connection 7 from the plug element 4. As a consequence, it is possible to avoid exposed voltage-carrying components.

Desired separation sites, such as the magnetic attachment 6 of the plug element 4 on the lifting arm 5, have the advantage that in the event of the motor vehicle that is connected to the plug element 4 setting itself in motion, the adjusting facility 3 can be separated in a controlled manner from the plug element 4. The plug-in connection 7 prevents voltage-carrying components of the charging cable or of the plug element 4 becoming exposed in the event of a separation. As a consequence, the battery of the motor vehicle can be charged in a particularly safe and reliable manner by means of the charging apparatus 1.

LIST OF REFERENCE NUMERALS

1 Charging apparatus
2 Base element
3 Adjusting facility
4 Plug element
5 Lifting arm
6 Magnetic attachment
7 Plug-in connection

What is claimed is:

1. A charging apparatus for charging a battery of an electrically operable vehicle, the charging apparatus comprising:
   a plug element that is connectable to a corresponding, vehicle-side plug element of the motor vehicle and via which electrical energy is transferrable to the motor vehicle so as to charge the battery;
   a base element that is connected to a current source and provides electrical energy from the current source for the plug element; and
   an adjusting facility via which the plug element is movable relative to the base element in order to connect the plug element to the vehicle-side plug element, and via which an electrical connection is provided between the base element and the plug element, wherein
   the adjusting facility has an overload protection via which the base element is electrically separated from the plug element in the event of a predetermined mechanical maximal load of the adjusting facility being exceeded, and
   the adjusting facility is a robotic facility that is attached at one end to the base element and at the other end is attached to the plug element.

2. The charging apparatus as claimed in claim 1, wherein
   the adjusting facility has a lifting arm configured to move the plug element relative to the base element, and
   at least one desired separation site is provided as the overload protection on the lifting arm and the lifting arm is mechanically separable at the desired separation site in order to separate the plug element from the base element in the event of the predetermined mechanical maximal load being exceeded.

3. The charging apparatus as claimed in claim 2, wherein
   the adjusting facility has a charging cable configured to transfer electrical energy from the base element to the plug element, and
   the charging cable comprises as the overload protection a plug-in connection that in the event of the predetermined mechanical maximal load being exceeded divides the charging cable into parts and/or separates the charging cable from the plug element and/or from the base element.

4. The charging apparatus as claimed in claim 3, wherein the plug-in connection comprises a first connecting face of the plug element and a second connecting face of the adjusting facility, which in order to attach the plug element to the adjusting facility is connectable to one another at their respective faces and are held against one another by way of a magnetic force.

5. The charging apparatus as claimed in claim 4, wherein
   the plug element is attached to the adjusting facility via a magnetic attachment, and
   the magnetic attachment separates the plug element from the adjusting facility in the event of a predetermined mechanical maximal load.

6. The charging apparatus as claimed in claim 5, wherein the predetermined mechanical maximal load is below a breakaway load of the adjusting facility that leads to the breakaway.

* * * * *